Feb. 4, 1964  A. J. SEDZIAK  3,120,085
PORTABLE INDEXING FIXTURE
Filed Aug. 4, 1960
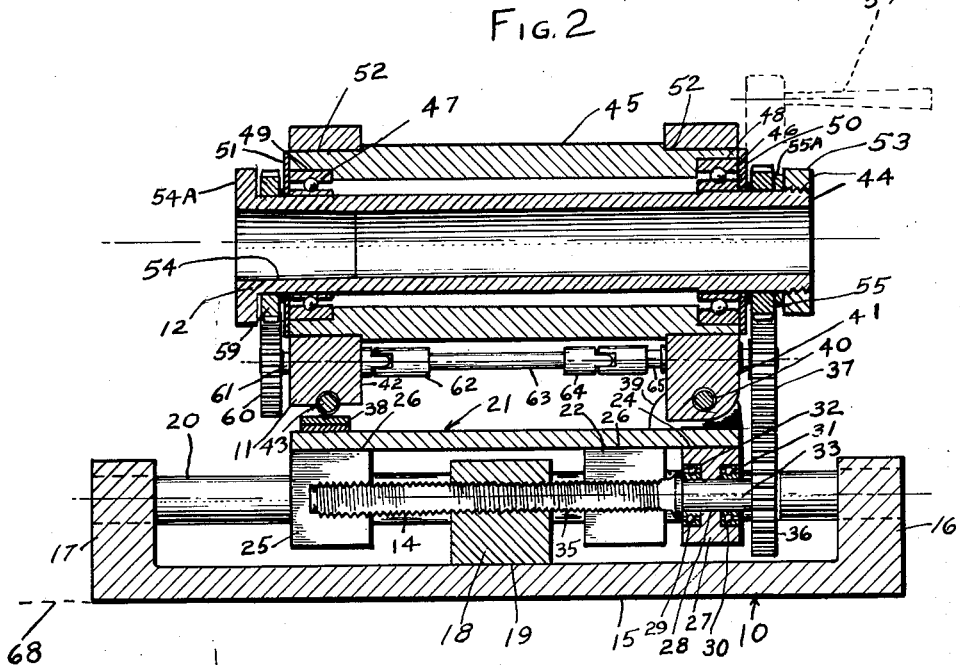
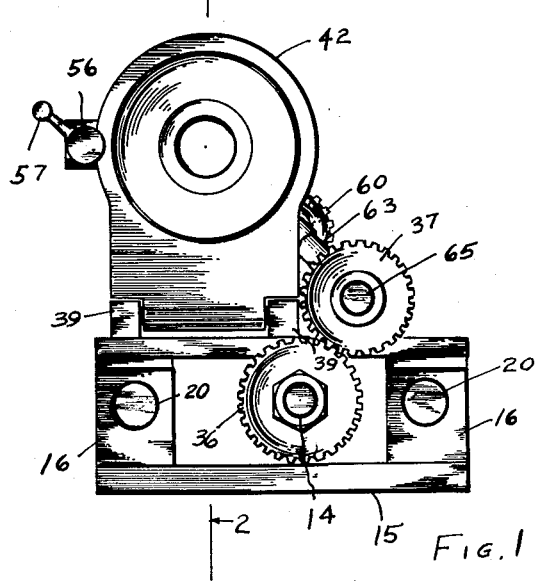
INVENTOR.
ANTHONY J. SEDZIAK
BY
Charles L. Lovercheck
attorney

United States Patent Office 3,120,085
Patented Feb. 4, 1964

3,120,085
PORTABLE INDEXING FIXTURE
Anthony J. Sedziak, Erie, Pa., assignor to Penn-Erie Manufacturing Company, Erie, Pa., a corporation of Pennsylvania
Filed Aug. 4, 1960, Ser. No. 47,454
4 Claims. (Cl. 51—232)

This invention relates to thread cutting machines and, more particularly, to portable indexing devices for use on thread grinding machine tables.

In manufacturing various articles such as dies for plastic molding of articles having internal threads in injection molding and the like, it is usually necessary to have a male threaded die or core member which has a particular amount of draft or taper. It is a difficult and time consuming operation to set up the ordinary metal working machine for forming the various draft angles or tapers required for various dies. Also, it is necessary to make the dimensions of the mandrel smaller than the hole desired in the article to account for the shrinkage of the material during molding. The amount of shrinkage varies for different materials and for different sized threads. This makes it necessary to cut a variety of non-standard threads of odd dimensions, pitch, or lead.

The gears which drive the chuck can be readily changed to provide a shrinkage lead on the core. A threaded core used in injection molding of plastic must have a certain percentage of shrink lead in addition to a certain pitch lead. That is, when specifications for an article to be molded call for a thread of a certain dimension to fit a mating thread on another member, allowance must be made to compensate for the shrinkage which will take place in molding.

The optimum shrink lead required can be accomplished readily with the fixture disclosed herein. The shrink lead is readily obtained by the selection of the proper gear ratio in a gear train readily changed to produce any lead desired. For example, if a part is to be molded in nylon with a shrink factor of .030 per inch and to have an internal thread of one inch outside diameter and a lead of .125 or eight threads per inch, the diameter is easily controlled by making the core 1.030 inch at the outside diameter. The proper lead can be accomplished by increasing the lead .030 per inch or three percent. In other words, eight full threads must extend over an area of 1.030 inch. Thus, when the part is removed from the mold and a shrinkage of .030 inch occurs, the part will have a standard thread of eight threads per 1.000 inch.

As can be readily seen, any shrinkage of materials can be compensated for by determining the amount of shrinkage which will occur and by using the device disclosed herein, the proper lead can be machined. Another feature of the fixture is the sine bar arrangement whereby a draft angle can be readily machined when cutting threads or, by disconnecting the gear train, a variety of draft angles can be ground or machined readily.

The axial movement is accomplished by a lead screw and nut and four standard gears as follows, for example:

Spindle gear—fixed gear (50 teeth)
First intermediate gear (40 to 60 teeth)
Second intermediate gear (40 to 60 teeth)
Drive gear (40 to 60 teeth)
Lead screw and nut (6–8–12–16 pitch)

The present invention discloses a portable indexing device which may be supported on a base and can be held in place by a magnetic chuck of a grinding or metal working machine table. The indexing device is provided with a suitable collet and face plate which may be rotated by a gear train. The various sized collets available and versatile nature of a face plate make it possible to attach a large number of sizes and configurations of work to the chuck support. The collet and face plate are also moved axially of the work supported thereon. A sine bar arrangement supports the collet on the base so that the collet may be tilted relative to the base to develop suitable draft angles.

Further, the portable indexing device itself can be moved about on the grinding machine table to develop lateral angles relative to the grinding machine whereby a compound angle can be ground or otherwise formed on a piece of material supported in the collet.

It is, accordingly, an object of the invention to provide an improved portable indexing thread grinding device.

Another object of the invention is to provide an improved portable indexing device having a sine bar built thereinto and having means for rotating and axially moving work thereon.

Still another object of this invention is to provide an indexing device having means to rotate the work connected through a gear train and universal joint connection to gears on an axially moving device thereon.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is an end view of an indexing device according to the invention; and

FIG. 2 is a cross sectional view taken on line 2—2 of FIG. 1.

Now with more particular reference to the drawing, the indexing machine shown is made up of a base 10 with a work support 11 supported thereon by means of a sine bar arrangement. The work support 11 carries a chuck support 12 which can be rotated by a gear train and, at the same time, carried inwardly and outwardly by means of a lead screw 14.

The base 10 has a flat bottom surface 15 suitable to rest on a magnetic table and having upwardly turned supports 16 and 17 at the opposite ends thereof. The base 10 could be made of a casting or forging or it could be fabricated. In some cases, it could even be molded or otherwise formed from a suitable non-metallic material when used with a non-magnetic table. At an intermediate point on the base 10, an upwardly extending threaded boss member 18 is attached at 19 to the base 10. The boss 18 has a threaded hole therethrough which receives the lead screw 14. Parallel, horizontally spaced, generally cylindrical ways 20 are attached to the upwardly turned supports 16 and 17 and they are slidably received in holes in pads 22 and 25 which are fixed to a plate like fixed index support 21 at 26.

A pad 27 is fixed to the index support 21 at 24. The pad 27 has a bore 28 therethrough which is counterbored at each end at 29 and 30 to receive anti-friction bearings 31 and 32. These bearings receive journal part 33 of the lead screw 14 which has a bearing surface thereon which is received in the anti-friction bearings 31 and 32 and extends outwardly and has a threaded portion 35 which engages the threaded bore in the threaded boss 18. A first gear 36 is fixed to the lead screw 14 by keying or otherwise and rotates therewith. The first gear 36 meshes with a fourth gear 37.

The work support 11 is carried on the fixed index support 21 by means of a sine bar arrangement so that it can be tilted relative thereto. The sine bar arrangement is made up of the work support 11 swingably attached to the index support 21 at 40 at one end and resting on gauge blocks 38 at the other end. The gauge blocks 38 rest on the top surface of the fixed support 21 and support one end of the work support 11. Laterally spaced ears 39 pivotally receive the pin 40 which is received in a pad 41 and may be locked thereto by means of a suitable set screw to prevent inadvertent removal. Pads 42 are fixed to the end of the index support 21 at the end opposite the pad 41. A bearing member 43 is attached to the pads 42 and the bearing member 43 rests on the gauge blocks 38.

The work support 11 rotatably receives a chuck support 44 which rotates in a chuck housing 45 on anti-friction bearings 46 and 47. These bearings are received in counterbores 48 and 49 and the bearings are held in place therein by plates 50 and 51 which may be attached to the ends of the housing 45 by suitable screws or other suitable fastening means.

A face plate 54A is shown integral with the chuck support 12; however, it could be attached in other ways. The housing 45 is fixed to the pads 41 and 42 and may be so secured by being inserted in a bore 52 therein which slides over the reduced size ends of the housing 45.

The chuck support 12 is carried in the inner race of the bearings 46 and 47 and has a nut 53 threadably attached to the chuck support 12 and it holds a gear 55 and a washer 55A in place on a tapered internal end 54. The inside of the chuck support 44 is bored to receive a conventional collet and collet tightener so that the work to be machined can be clamped rigidly in the collet and clamped thereto to rotate with the chuck support 44.

The second gear 55 is fixed to the outer periphery of the chuck support 44 and rotates therewith. This gear meshes with a gear fixed to a shaft 56 which may be rotated manually by means of a crank handle 57. A gear 59 is also fixed to the chuck support 44 at the end opposite the gear 55. The gear 59 meshes with a gear 60 which is fixed to a shaft 61. The shaft 61 is supported in a bearing in the pad 42 and connected to a universal joint 62 to rotate therewith. The universal joint 62 is fixed to a shaft 63 which is in turn fixed to a universal joint 64. The universal joint 64 is fixed to a shaft 65 and the shaft 65 is carried in a bearing on the index support 21 so that the gear 60, shaft 61, universal joints 62 and 64, and shaft 63 can swing independently of the shaft 65 and the gear 37 and the gear 60 can rotate with the axis of its shaft offset from the axis of the gear 37. Therefore, the gear 37 can be operated in an optimum aligned position relative to the gear 36 and the axes of the gears 36 and 37 do not move relative to each other when the angle of the chuck support 44 is changed relative to the index support 21.

In operation, the indexing device is supported on a grinding machine table or the like which is generally indicated at 68 and which may be of the magnetic chuck variety. An article to be ground such as a blank to be threaded for use as a part of a plastic mold is supported in a collet in the chuck support 44 and the entire indexing device is moved to the correct angular position on the machine table in the horizontal plane to which it is to be ground relative to the grinding wheel on the table. The position on the table can be located by a suitable gauge sine bar. The article to be ground is then supported in the collet or holding device and a sufficient number of gauge blocks 38 supported under the bearing member 43 to give the article being ground the proper angular relation relative to the horizontal. Then the grinding machine wheel is moved into engagement with the work and the handle 57 rotated. With the rotation of the handle 57, the index support 21 carrying the chuck member 44 therewith moves axially to and fro on the ways 20 and, at the same time, the chuck member 44 is rotated at a fixed ratio relative thereto.

The gears 36, 37, 59, and 60 can be readily changed to provide different ratios of movement of the lead screw 14 relative to the rotation of the chuck support. Thus, a shrinkage lead of any desired magnitude can be obtained.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A portable indexing device comprising a base having a flat bottom suitable for supporting on a machine table, upwardly extending way supports on said base, laterally spaced, generally cylindrical ways fixed to said way supports, a plate like index support, said index support having laterally and longitudinally spaced pads attached to one side thereof, bores in said pads slidably receiving said ways, a lead screw, a pad attached to said index support and rotatably receiving one end of said lead screw, a bored threaded boss on said base, said lead screw threadably engaging said bored boss, a first gear fixed to said lead screw, a work support, one end of said work support swingably attached to said index support, means to support the other end of said work support at predetermined distances from said index support, a chuck support rotatably supported on said work support, a second gear fixed to said chuck support, a third gear on said work support meshing with said second gear, a fourth gear on said index support meshing with said first gear, and flexible shaft means connecting said third gear to said fourth gear to rotate therewith whereby when said chuck support is rotated, said lead screw moves said index support and said work support over said ways.

2. The indexing device recited in claim 1 wherein said means to support said other end of said work support comprises gauge blocks.

3. The indexing device recited in claim 1 wherein said chuck support is hollow and has means therein to receive a collet.

4. A portable indexing device comprising a base having a flat bottom suitable for supporting on a machine table, an index support, way means on said base supporting said index support for translatory movement thereon, said index support being plate like and having laterally and longitudinally spaced bosses attached to one side thereof, bores in said bosses slidably receiving said way means, a lead screw, a pad attached to said index support and rotatably receiving one end of said lead screw, a bored boss on said base, said lead screw threadably engaging said bored boss, a first gear fixed to said lead screw, a work support, one end of said work support swingably attached to said index support, means to support the other end of said work support at predetermined distances from said index support, a chuck rotatably supported on said work support, a second gear fixed to said chuck, a third gear on said work support meshing with said second gear, a fourth gear on said index support meshing with said first gear, and flexible shaft means connecting said third gear to said fourth gear to rotate therewith whereby when said chuck is rotated, said lead screw moves said index support and said work support over said way means.

References Cited in the file of this patent

UNITED STATES PATENTS

| | | |
|---|---|---|
| 359,439 | Gilroy | Mar. 15, 1887 |
| 2,407,577 | Rickenmann | Sept. 10, 1946 |
| 2,746,218 | Bowie et al. | May 22, 1956 |
| 2,851,832 | Anania | Sept. 16, 1958 |
| 2,887,828 | Martin | May 26, 1959 |